United States Patent
Lee

(10) Patent No.: US 6,248,042 B1
(45) Date of Patent: Jun. 19, 2001

(54) SHIFT CONTROL METHOD FOR AUTOMATIC TRANSMISSION

(75) Inventor: Hee-Yong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/471,033

(22) Filed: Dec. 23, 1999

(30) Foreign Application Priority Data

Jun. 30, 1999 (KR) ............................................. 1999-26054

(51) Int. Cl.⁷ ...................................................... F16H 61/04
(52) U.S. Cl. ........................ 477/155; 477/143; 477/109; 477/94
(58) Field of Search ............................... 477/94, 98, 109, 477/143, 155

(56) References Cited

U.S. PATENT DOCUMENTS

| | | | | |
|---|---|---|---|---|
| 5,203,235 | * | 4/1993 | Lizuka .................................. | 477/94 |
| 5,293,789 | * | 3/1994 | Goto et al. ......................... | 477/152 X |
| 5,439,427 | * | 8/1995 | Enokido et al. .................. | 477/143 X |
| 5,517,411 | * | 5/1996 | Genise et al. ..................... | 477/94 X |
| 5,626,536 | * | 5/1997 | Kono et al. ........................... | 477/181 |
| 5,795,265 | * | 8/1998 | Domian et al. ..................... | 477/143 |
| 5,795,282 | * | 8/1998 | Robinson ............................. | 477/92 |
| 5,820,517 | * | 10/1998 | Saito et al. ......................... | 477/109 |
| 5,865,708 | * | 2/1999 | Nishio et al. ....................... | 477/155 |
| 5,879,268 | * | 3/1999 | Yasue et al. ........................ | 477/143 |
| 5,931,885 | * | 8/1999 | Kubo et al. ....................... | 477/143 X |
| 5,976,057 | * | 11/1999 | Mori .................................... | 477/143 X |
| 5,980,426 | * | 11/1999 | Kamada et al. ..................... | 477/143 |
| 6,007,458 | * | 12/1999 | Ohashi et al. ..................... | 477/155 X |
| 6,123,645 | * | 9/2000 | Hopper ............................... | 477/164 |

* cited by examiner

Primary Examiner—Charles A. Marmor
Assistant Examiner—Roger Pang
(74) Attorney, Agent, or Firm—Birch, Stewart, Kolasch & Birch, LLP

(57) ABSTRACT

Disclosed is a shift control method for automatic transmissions. The method includes the steps of maintaining duty at 100% in a first speed of a drive D range, then determining if a first condition of a throttle opening being under a predetermined value during a first predetermined time is satisfied, and determining if a second condition is met during a second predetermined time, and if both the first and second conditions are satisfied, controlling duty to a first duty value then controlling duty according to a first reduction slope, after which it is determined if turbine rpm has changed; outputting a fuel reduction request signal if it is determined that the turbine rpm has changed, controlling duty to a second duty value then controlling duty according to a second reduction slope, determining if the turbine rpm has reached a predetermined standard value, controlling duty to a third duty value if the turbine rpm has reached the predetermined standard value, and maintaining duty to a fixed level and maintaining a neutral N range; and determining if conditions for releasing the neutral N range are satisfied, and if the conditions for releasing the neutral N range are determined to be satisfied performing control for shifting into the first speed of the drive D range, and outputting a fuel reduction stop signal such that the fuel reduction request signal is discontinued.

4 Claims, 4 Drawing Sheets

SHIFT CONTROL METHOD FOR AUTOMATIC TRANSMISSION

BACKGROUND OF THE INVENTION (a) Field of the Invention

The present invention relates to an automatic transmission for vehicles. More particularly, the present invention relates to a shift control method for an automatic transmission which temporarily controls the automatic transmission into a neutral state when the vehicle is stopped in a first speed of a drive D range, thereby reducing drone noise and minimizing fuel consumption.

(b) Description of the Related Art

In the automatic transmission used for vehicles, a shift control system performs control to realize automatic shifting into different speeds and shift ranges according to various factors including throttle opening, vehicle speed and load, and several other engine and driving conditions detected through a plurality of sensors. That is, based on such various factors, the shift control system controls a plurality of solenoid valves of a hydraulic control system such that hydraulic flow in the hydraulic control system is specifically directed, ultimately resulting in shifting of the transmission into the various speeds and shift ranges.

In more detail, when the driver manipulates a shift lever to a particular shift range, a manual valve of the hydraulic control system undergoes port conversion as a result of the manual valve being indexed with the shift lever. Accordingly, hydraulic pressure supplied from a hydraulic pump selectively engages a plurality of friction elements of a gear shifting mechanism according to the duty control of the solenoid valves, thereby realizing shifting into the desired shift range.

Through such operations, as a result of a specific transfer of hydraulic pressure in the hydraulic control system, the friction elements of a low-reverse brake, an underdrive clutch and a reduction brake are selectively engaged to realize shifting into a first speed of a drive D range; the friction elements of a second brake, the underdrive clutch and the reduction brake are selectively engaged to realize shifting into a second speed of the drive D range; the friction elements of the underdrive clutch, an overdrive clutch and the reduction brake are selectively engaged to realize shifting into a third speed of the drive D range; the friction elements of the underdrive clutch, the overdrive clutch and a direct clutch are selectively engaged to realize shifting into a fourth speed of the drive D range; the friction elements of the second brake, the overdrive clutch and the direct clutch are selectively engaged to realize shifting into a fifth speed of the drive D range; the friction elements of the low-reverse brake, the reduction brake and a reverse brake are selectively engaged to realize shifting into a reverse R range; and the friction elements of the low-reverse brake and the reduction brake are selectively engaged to realize shifting into a neutral N range and a park P range.

In such an automatic transmission, shift quality is determined by how smoothly the friction elements are engaged and disengaged. Namely, when changing shift ranges and especially when changing speeds in the drive D range, the timing between the engagement of a specific set of friction elements in relation to the disengagement of another specific set of friction elements determines the shift quality of the automatic transmission. Accordingly, there have been ongoing efforts to develop improved shift control methods that enhance shift quality by better controlling the timing of friction elements to engaged and disengaged states.

With the use of conventional shift control methods, when the vehicle is temporarily stopped in the drive D range by the driver depressing the brake pedal, the first speed of the drive D range is maintained through the selective engagement of the low-reverse brake, underdrive clutch and reduction brake. If the vehicle is stopped for an extended period, for example at a stop light, substantial drone noise is generated both as a result of slippage between the engaged friction elements and by a turbine of a torque converter. Further, a considerable amount of fuel is consumed in such a state since engine load is maintained while in the first speed of the drive D range, resulting also in the generation of significant exhaust emissions.

SUMMARY OF THE INVENTION

The present invention has been made in an effort to solve the above problems.

It is an object of the present invention to provide a shift control method for an automatic transmission which, if it is determined that the vehicle is stopped in a first speed of a drive D range, (a) determines if a plurality of vehicle conditions are satisfied then duty controls an underdrive clutch to temporarily control the automatic transmission into a neutral state, and (b) reduces engine rpm when a fuel reduction request signal is output, thereby limiting drone noise and the discharge of exhaust gases. To achieve the above object, the present invention provides a shift control method for automatic transmissions. The method includes the steps of maintaining duty at 100% in a first speed of a drive D range, then determining if a first condition of a throttle opening being under a predetermined value during a first predetermined time is satisfied, and determining if a second condition is met during a second predetermined time, and if both the first and second conditions are satisfied, controlling duty to a first duty value then controlling duty according to a first reduction slope, after which it is determined if turbine rpm has changed; outputting a fuel reduction request signal if it is determined that the turbine rpm has changed, controlling duty to a second duty value then controlling duty according to a second reduction slope, determining if the turbine rpm has reached a predetermined standard value, controlling duty to a third duty value if the turbine rpm has reached the predetermined standard value, and maintaining duty to a fixed level and maintaining a neutral N range; and determining if conditions for releasing the neutral N range are satisfied, and if the conditions for releasing the neutral N range are determined to be satisfied, performing control for shifting into the first speed of the drive D range, and outputting a fuel reduction stop signal such that the fuel reduction request signal is discontinued.

According to a feature of the present invention, the second condition includes determining (1) if the throttle opening is less than a reference value; (2) if the first speed of the drive D range or of a low 2 range is maintained; (3) if an oil temperature is higher than a reference temperature; (4) if engine rpm is higher than a reference engine rpm; (5) if a vehicle speed is higher than a reference speed; (6) if turbine rpm is higher than a reference turbine rpm; and (7) if a brake switch has been controlled to ON.

According to another feature of the present invention, in the step of determining if the conditions for releasing the neutral N range are satisfied, if the second condition is not satisfied while the first condition is satisfied, it is determined that the conditions for releasing the neutral N range are satisfied.

According to yet another feature of the present invention, if the first condition is not satisfied such that the throttle opening is greater than the predetermined value, control for performing normal shifting through speeds of the drive D range, up to a third speed of the drive D range, is performed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
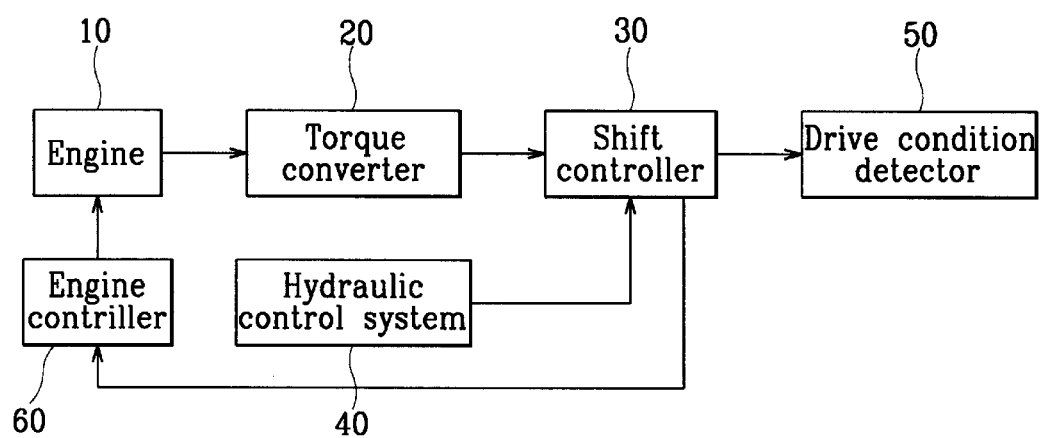
FIG. 1 is a block diagram of a shift control system and related elements to which the present invention is applied.

FIG. 1 shows a block diagram of a shift control system and related elements to which the present invention is applied.

In the shift control system and related elements to which the present invention is applied, when rotational force of an engine 10 is transmitted to a torque converter 20, a rotational speed of a turbine of the torque converter 20 is detected and input to a shift controller 30. Also at this time, a drive condition detector 40 detects overall drive conditions of the vehicle such as throttle opening, vehicle speed, turbine rpm, transmission temperature, engine rpm, brake engagement, etc., and outputs electrical signals corresponding to the detected driving conditions to the shift controller 30. Further, the shift controller 30 outputs predetermined signals to an engine controller 60 such that the engine controller 60 controls specific operations of an engine, such as engine rpm.

Using the signals received from the drive condition detector 40, the shift controller 30 determines overall driving conditions of the vehicle, then outputs duty control signals according to an established map table such that hydraulic pressure of a hydraulic control system 50 is controlled. Also, depending on the overall driving conditions detected, the shift controller 30 may output a fuel reduction request signal to the engine controller 60 such that engine rpm is reduced.

The hydraulic control system 50 drives solenoid valves according to the control signals output from the shift controller 30 so that specific friction elements are controlled. In particular, a low-reverse brake is selectively engaged in a first speed of a drive D range, a reverse R range, a neutral N range and a park P range; a second brake is selectively engaged in second and fifth speeds of the drive D range; an underdrive clutch is selectively engaged in first, second, third and fourth speeds of the drive D range; an overdrive clutch is selectively engaged in the third, fourth and fifth speeds of the drive D range; a reduction brake is selectively engaged in the first, second and third speeds of the drive D range; a direct clutch is selectively engaged in the fourth and fifth speeds of the drive D range; and a reverse brake is selectively engaged in the reverse R range.

Figure 2A:
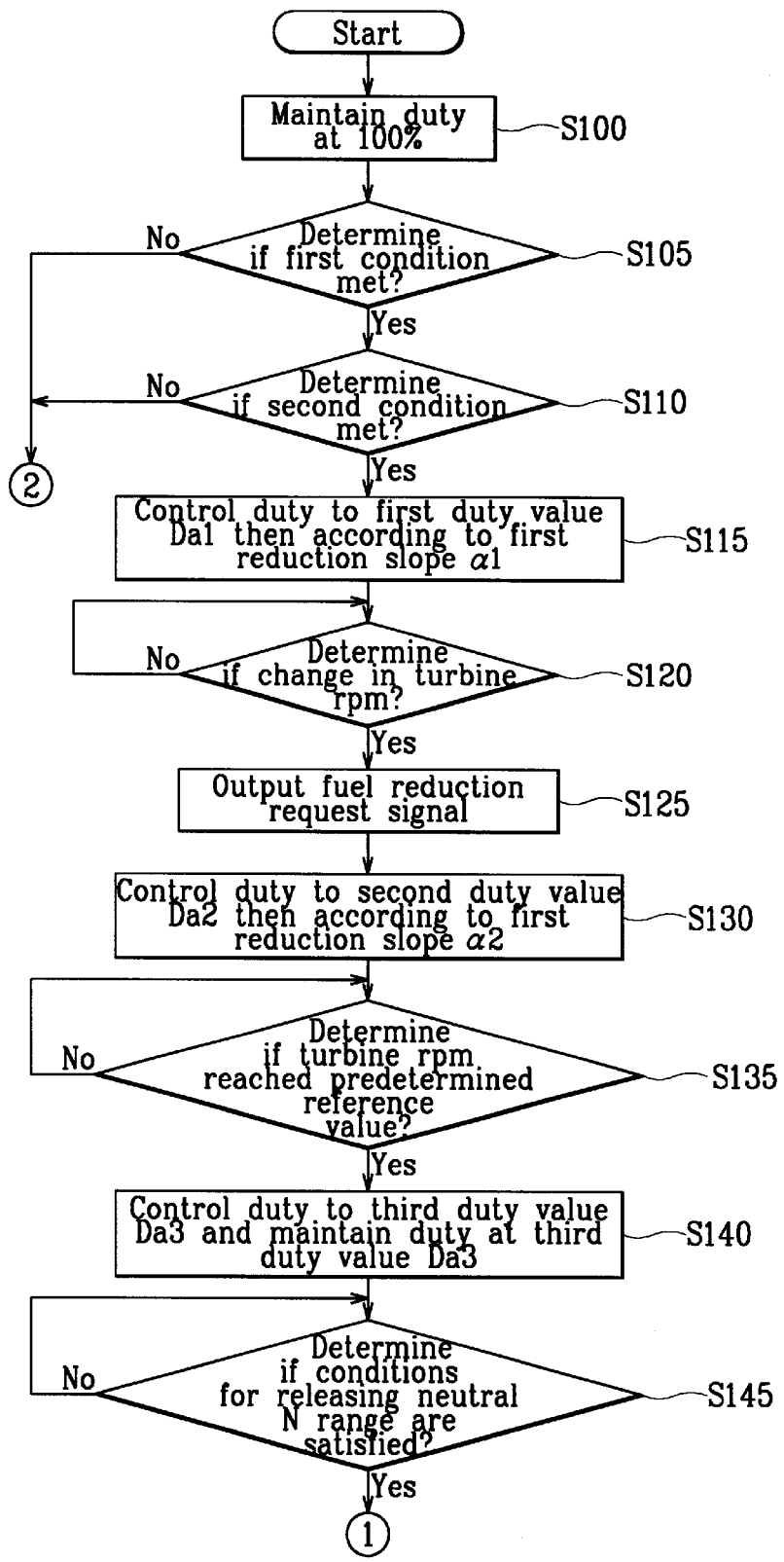
FIG. 2a and FIG. 2b show is a flow chart of a shift control method according to a preferred embodiment of the present invention.
Figure 2B:
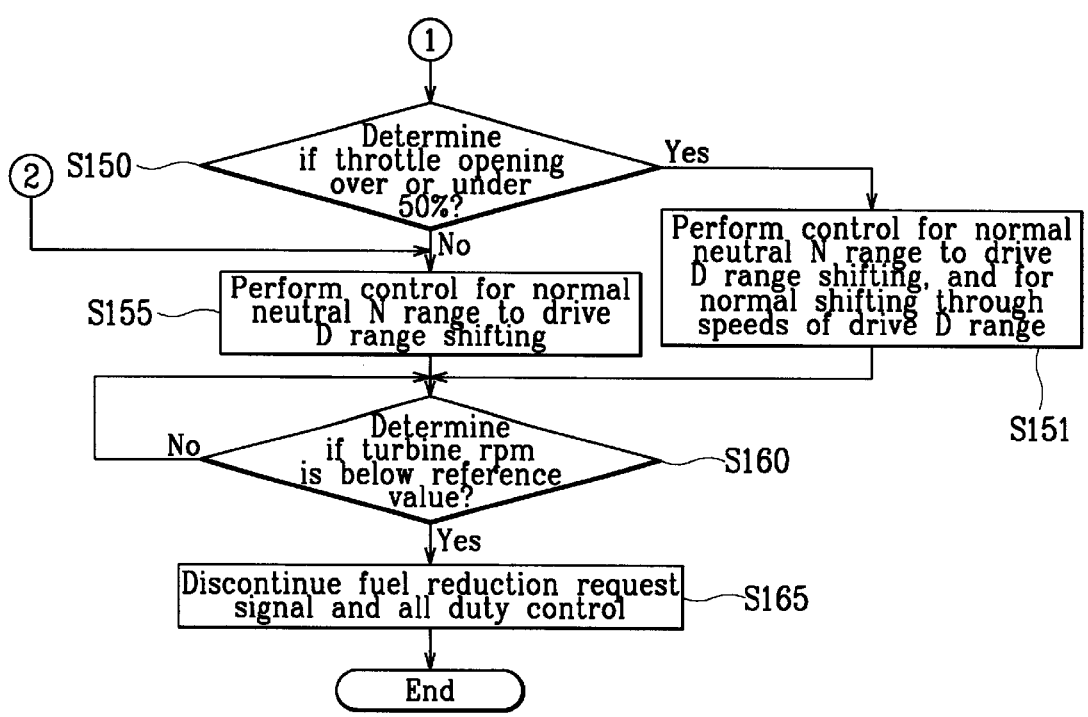

FIG. 2 shows a flow chart of a shift control method according to a preferred embodiment of the present invention.

Figure 3:
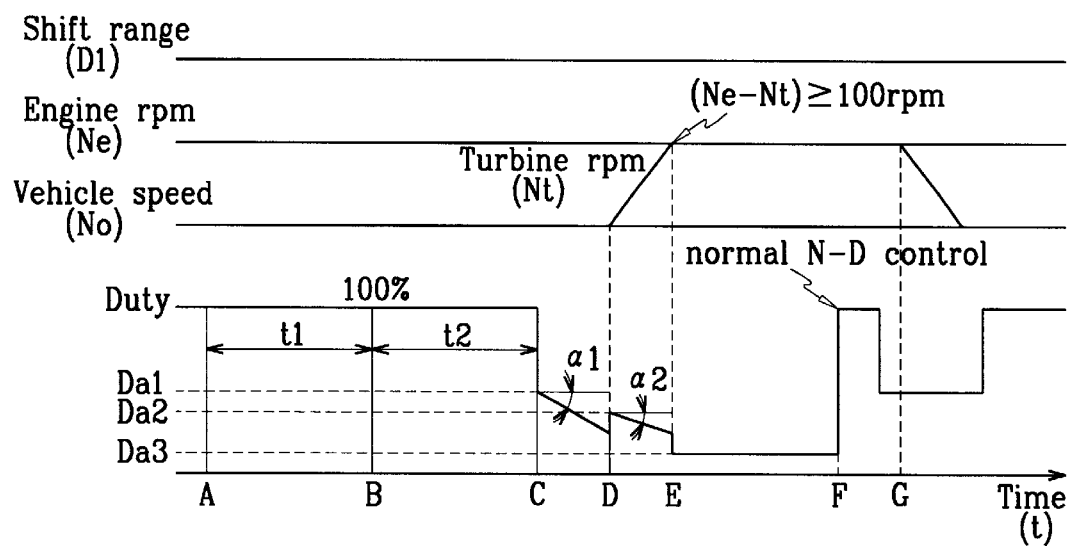
FIG. 3 is graph of a shift control pattern during the operation of the shift control method of the present invention.

When the brake pedal is depressed by the driver to stop the vehicle, the shift controller 30, based on the signals output by the drive condition detector 40, performs control to shift the automatic transmission into a suitable speed. That is, after duty is maintained at 100% in step S100 as shown in FIG. 3, the shift controller 30 determines if a first condition is met in step S105. In particular, the shift controller 30 determines if a throttle opening Th is under 50% during a first predetermined time t1 of 2 seconds (i.e., during an A-B interval of FIG. 3). If it is determined that the throttle opening Th is not under but over 50% (tip-up), the shift controller 30 performs control such that the drive D range is maintained in a normal state. Here, it is also possible for the automatic transmission to be maintained in a normal low 2 range if the transmission started the process in this range.

However, in step S105, if it is determined that the throttle opening Th is under 50% during the first predetermined time t1, and therefore that the first condition is met, the shift controller 30 determines if a second condition is met during a second predetermined time t2 (i.e., during a B-C interval of FIG. 3) in step S110. That is, the shift controller 30 determines if seven different aspects of the second condition are satisfied: (1) if the throttle opening Th is such that it's sensor develops a reference value of less than 0.7V; (2) if the first speed of the drive D range or of the low 2 range is maintained; (3) if an oil temperature is higher than a reference temperature (0° C.); (4) if engine rpm Ne is higher than a reference engine rpm (1000 rpm); (5) if a vehicle speed is higher than a reference speed; (6) if turbine rpm Nt is higher than a reference turbine rpm (35 rpm); and (7) if a brake switch has been controlled to ON. Here, all seven aspects of the second condition must be satisfied for the shift controller 30 to determine that the second condition is met in step S110.

In step S110, if it is determined that the second condition is satisfied, the shift controller 30 duty controls a third friction element to a predetermined duty so that the transmission is controlled from the first speed of the drive D range to the neutral N range. In more detail, to temporarily control the stopped vehicle into the neutral N range, after the duty of 100% is controlled to a predetermined first duty value Da1 at the start of a C-D interval, the shift controller 30 again controls the duty according to a predetermined first reduction slope $\alpha 1$ in step S115. Here, while the duty is controlled according to the first reduction slope $\alpha 1$, the shift controller 30 determines if there has been a change in the turbine rpm Nt in step S120.

In step S120, if it is determined that there has been a change in the turbine rpm Nt while the duty is controlled according to the first reduction slope $\alpha 1$, the shift controller 30 outputs a fuel reduction request signal to the engine controller 60 to reduce engine rpm in step S125. Subsequently, after the duty is controlled to a predetermined second duty value Da2 at the start of a D-E interval, the shift controller 30 again controls the duty according to a predetermined second reduction slope $\alpha 2$ in step S130. Here, while the duty is controlled according to the second reduction slope $\alpha 2$, the shift controller 30 determines if the turbine rpm Nt has reached a predetermined reference value of 100 rpm in step S135.

In step S135, if it is determined that the turbine rpm Nt has reached the predetermined reference value of 100 rpm, the shift controller 30 controls the duty to a predetermined third duty value Da3 at the start of an E-F interval, after which the duty is maintained at this level during the E-F interval to maintain the transmission in the neutral N range in step S140. Next, it is determined if conditions for releasing the neutral N range are satisfied in step S145. That is, the shift controller 30 determines if the seven different aspects of the second condition are satisfied as in step S110, and if they are not satisfied, the shift controller 30 determines if the throttle opening Th is over or under 50% in step S150.

If it is determined that the throttle opening Th is under 50% in step S150, the shift controller 30 performs control for normal neutral N range to drive D range shifting as step S155. Next, it is determined if the turbine rpm (Ne—Nt) has started to be reduced below the reference value of 30 rpm in step S160. If it is determined that the turbine rpm (Ne—Nt) has started to be reduced below the reference value of 30 rpm, the shift controller 30 outputs a fuel reduction stop signal to the engine controller 60 such that the fuel reduction request signal is discontinued, and also discontinues all duty control in step S165. At this time, the overdrive clutch is engaged so that the first speed of the drive D range is maintained.

In step S150 above, if it is determined that the throttle opening Th is over 50%, the shift controller 30 does not perform control for shifting in the neutral N range, and instead performs control for normal neutral N range to drive D range shifting, and normal shifting through the speeds of the drive D range up to the third speed of the same in step S151.

In the shift control method of the present invention described above, if predetermined conditions are satisfied while the vehicle is stopped in the drive D range, the transmission is controlled into the neutral N range, after which shifting into the first speed of the drive D range is performed when the driver again desires to drive. With such control, drone noise, fuel consumption and vehicle emissions are reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for automatic transmissions comprising the steps of:

maintaining duty at 100% in a first speed of a drive D range, then determining if a first condition of a throttle opening being under a predetermined value during a first predetermined time is satisfied, and determining if a second condition is met during a second predetermined time, and if both the first and second conditions are satisfied, controlling duty to a first duty value then controlling duty according to a first reduction slope, after which it is determined if turbine rpm has changed;

outputting a fuel reduction request signal if it is determined that the turbine rpm has changed, controlling duty to a second duty value then controlling duty according to a second reduction slope, determining if the turbine rpm has reached a predetermined standard value, controlling duty to a third duty value if the turbine rpm has reached the predetermined standard value, and maintaining duty to a fixed level and maintaining a neutral N range; and determining if conditions for releasing the neutral N range are satisfied, and if the conditions for releasing the neutral N range are determined to be satisfied performing control for shifting into the first speed of the drive D range, and outputting a fuel reduction stop signal such that the fuel reduction request signal is discontinued.

2. The method of claim 1 wherein the second condition includes determining (1) if the throttle opening is less than a reference value; (2) if the first speed of the drive D range or of a low 2 range is maintained; (3) if an oil temperature is higher than a reference temperature; (4) if engine rpm is higher than a reference engine rpm; (5) if a vehicle speed is higher than a reference speed; (6) if turbine rpm is higher than a reference turbine rpm; and (7) if a brake switch has been controlled to ON.

3. The method of claim 1 wherein in the step of determining if the conditions for releasing the neutral N range are satisfied, if the second condition is not satisfied while the first condition is satisfied, it is determined that the conditions for releasing the neutral N range are satisfied.

4. The method of claim 3 wherein if the first condition is not satisfied such that the throttle opening is over the predetermined value, control for performing normal shifting through speeds of the drive D range, up to a third speed of the drive D range, is performed.

\* \* \* \* \*